(12) United States Patent
Zhang et al.

(10) Patent No.: US 12,725,878 B2
(45) Date of Patent: Sep. 1, 2026

(54) SPRING HOLDER FOR PRESSURE EQUALIZATION DEVICE FOR TRACTION BATTERY PACK

(71) Applicant: Ford Global Technologies, LLC, Dearborn, MI (US)

(72) Inventors: Xiaogang Zhang, Novi, MI (US); Alexander Robert Rink, Royal Oak, MI (US); Parikshit Gupte, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 581 days.

(21) Appl. No.: 18/218,630

(22) Filed: Jul. 6, 2023

(65) Prior Publication Data

US 2025/0015424 A1 Jan. 9, 2025

(51) Int. Cl.

| | |
|---|---|
| ***H01M 50/333*** | (2021.01) |
| ***B60L 50/64*** | (2019.01) |
| ***F16K 17/04*** | (2006.01) |
| ***H01M 50/249*** | (2021.01) |

(52) U.S. Cl.

CPC ........... *H01M 50/333* (2021.01); *B60L 50/64* (2019.02); *F16K 17/04* (2013.01); *H01M 50/249* (2021.01); *H01M 2220/20* (2013.01)

(58) Field of Classification Search

CPC ............. H01M 50/333; H01M 50/249; H01M 2220/20; H01M 2200/20; H01M 10/0481; H01M 50/325; H01M 50/375; B60L 50/64; F16K 17/04; Y02E 60/10

See application file for complete search history.

(56) References Cited

U.S. PATENT DOCUMENTS

| | | | | |
|---|---|---|---|---|
| 5,974,819 | A | 11/1999 | Poling et al. | |
| 8,268,469 | B2 | 9/2012 | Hermann et al. | |
| 8,778,519 | B1 | 7/2014 | Frey et al. | |
| 11,081,739 | B2 | 8/2021 | Hermann | |
| 11,283,121 | B1 | 3/2022 | Boecker et al. | |
| 11,316,230 | B1 | 4/2022 | Boecker et al. | |
| 11,342,615 | B2 * | 5/2022 | Davies | H01M 50/1535 |

(Continued)

FOREIGN PATENT DOCUMENTS

| | | | |
|---|---|---|---|
| DE | 102013213909 | A1 | 1/2015 |
| JP | 4297892 | B2 | 7/2009 |

(Continued)

*Primary Examiner* — Helen Oi K Conley

(74) *Attorney, Agent, or Firm* — David B. Kelley; Carlson, Gaskey & Olds, P.C.

(57) ABSTRACT

A traction battery pack may include an outer enclosure assembly. A traction battery pack may include a pressure equalization device received within a wall of the outer enclosure assembly. The pressure equalization device may include a housing and a valve configured to close a gas path through the housing during a battery thermal event of the traction battery pack. The valve may include a spring configured to urge the valve to close during the battery thermal event. The spring is held in place by a spring holder. The spring holder includes a first set of openings spaced-apart from the spring by a first distance, and a second set of openings spaced-apart from the spring by a second distance less than the first distance.

20 Claims, 7 Drawing Sheets

(56) References Cited

U.S. PATENT DOCUMENTS

| | | | | |
|---|---|---|---|---|
| 2006/0159985 | A1* | 7/2006 | Jones .................. | H01M 50/627 429/88 |
| 2012/0244399 | A1 | 9/2012 | Tartaglia | |
| 2017/0259937 | A1 | 9/2017 | Plessner et al. | |
| 2018/0334022 | A1 | 11/2018 | Rawlinson et al. | |
| 2021/0116178 | A1 | 4/2021 | Zielinski | |
| 2021/0148478 | A1 | 5/2021 | Yue et al. | |
| 2021/0159473 | A1 | 5/2021 | Han et al. | |

FOREIGN PATENT DOCUMENTS

| | | | |
|---|---|---|---|
| JP | 6365884 | B2 | 8/2018 |
| WO | 2022003716 | A1 | 1/2022 |

* cited by examiner

SPRING HOLDER FOR PRESSURE EQUALIZATION DEVICE FOR TRACTION BATTERY PACK

TECHNICAL FIELD

This disclosure relates to a spring holder for a pressure equalization device for a traction battery pack of an electrified vehicle.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on the internal combustion engine to propel the vehicle.

A high voltage traction battery pack typically powers an electric machine and other electrical loads of an electrified vehicle. The traction battery pack includes a plurality of battery cells and various other battery internal components that are housed inside an outer enclosure assembly for supporting the electric propulsion of the vehicle. The outer enclosure assembly must be sealed and vented to prevent moisture from accumulating within the interior of the battery pack. Temperature fluctuations inside the battery pack can create pressure differentials between the battery interior and its surrounding atmosphere.

SUMMARY

In some aspects, the techniques described herein relate to a traction battery pack, including: an outer enclosure assembly; and a pressure equalization device received within a wall of the outer enclosure assembly, wherein the pressure equalization device includes a housing and a valve configured to close a gas path through the housing during a battery thermal event of the traction battery pack, wherein the valve includes a spring configured to urge the valve to close during the battery thermal event, wherein the spring is held in place by a spring holder, wherein the spring holder includes a first set of openings spaced-apart from the spring by a first distance, and a second set of openings spaced-apart from the spring by a second distance less than the first distance.

In some aspects, the techniques described herein relate to a traction battery pack, wherein the spring holder includes a wall in contact with a first end of the spring.

In some aspects, the techniques described herein relate to a traction battery pack, wherein: the spring holder includes a ring between the first set of openings and the second set of openings, and the ring is spaced-apart axially from the wall.

In some aspects, the techniques described herein relate to a traction battery pack, wherein the ring is continuous about an entire circumference of the ring.

In some aspects, the techniques described herein relate to a traction battery pack, wherein: the spring holder includes a plurality of first legs spaced-apart circumferentially from one another by a respective one of the openings of the first set, and the spring holder includes a plurality of second legs spaced-apart circumferentially from one another by a respective one of the openings of the second set.

In some aspects, the techniques described herein relate to a traction battery pack, wherein: the first legs project between the ring and an outer ring of the spring holder, and the second legs project between the ring and the wall.

In some aspects, the techniques described herein relate to a traction battery pack, wherein the first legs exhibit a width dimension tapering moving radially inwardly.

In some aspects, the techniques described herein relate to a traction battery pack, wherein the second legs exhibit a width dimension tapering moving radially inwardly.

In some aspects, the techniques described herein relate to a traction battery pack, wherein: the first legs lie in a plane substantially perpendicular to a central axis of the valve, and the second legs project from the ring to the wall in both an axial direction and a radial direction.

In some aspects, the techniques described herein relate to a traction battery pack, wherein the second legs are curved such that the second legs are convex when viewed from a point adjacent a piston in contact with the spring.

In some aspects, the techniques described herein relate to a traction battery pack, wherein the first set of openings and the second set of openings are differently-shaped.

In some aspects, the techniques described herein relate to a traction battery pack, wherein the second set of openings are circular-shaped when viewed from a point adjacent a piston in contact with the spring.

In some aspects, the techniques described herein relate to a traction battery pack, wherein: a second end of the spring is in contact with a piston, the second end is opposite the first end, and during the battery thermal event, the spring is configured to move the piston in a direction opposite the spring holder to close the valve.

In some aspects, the techniques described herein relate to a traction battery pack, including a plurality of battery arrays housed inside the outer enclosure assembly.

In some aspects, the techniques described herein relate to a traction battery pack, wherein the spring is made of a shape-memory alloy.

In some aspects, the techniques described herein relate to a pressure equalization device for traction battery pack, including: a housing; and a valve configured to close a gas path through the housing during a battery thermal event of the traction battery pack, wherein the valve includes a spring configured to urge the valve to close during the battery thermal event, wherein the spring is held in place by a spring holder, wherein the spring holder includes a first set of openings spaced-apart from the spring by a first distance, and a second set of openings spaced-apart from the spring by a second distance less than the first distance.

In some aspects, the techniques described herein relate to a pressure equalization device, wherein: the spring holder includes a wall in contact with a first end of the spring, the spring holder includes a ring between the first set of openings and the second set of openings, and the ring is spaced-apart axially from the wall.

In some aspects, the techniques described herein relate to a pressure equalization device, wherein: the spring holder includes a plurality of first legs spaced-apart circumferentially from one another by a respective one of the openings of the first set, and the spring holder includes a plurality of second legs spaced-apart circumferentially from one another by a respective one of the openings of the second set.

In some aspects, the techniques described herein relate to a pressure equalization device, wherein: the first legs project between the ring and an outer ring of the spring holder, and the second legs project between the ring and the wall.

In some aspects, the techniques described herein relate to a pressure equalization device, wherein: the first legs lie in a plane perpendicular to a central axis of the valve, the second legs project from the ring to the wall in both an axial direction and a radial direction, and the second legs are curved such that the second legs are convex when viewed from a point adjacent a piston in contact with the spring.

BRIEF DESCRIPTION OF THE DRAWINGS

In FIG. 4, a valve of the pressure equalization device is in an open position.

DETAILED DESCRIPTION

This disclosure relates to a spring holder for a pressure equalization device for a traction battery pack of an electrified vehicle. Among other benefits, which will be appreciated from the below description, this disclosure directs additional fluid to the spring, which decreases the time to close the valve of the pressure equalization device.

Figure 1:
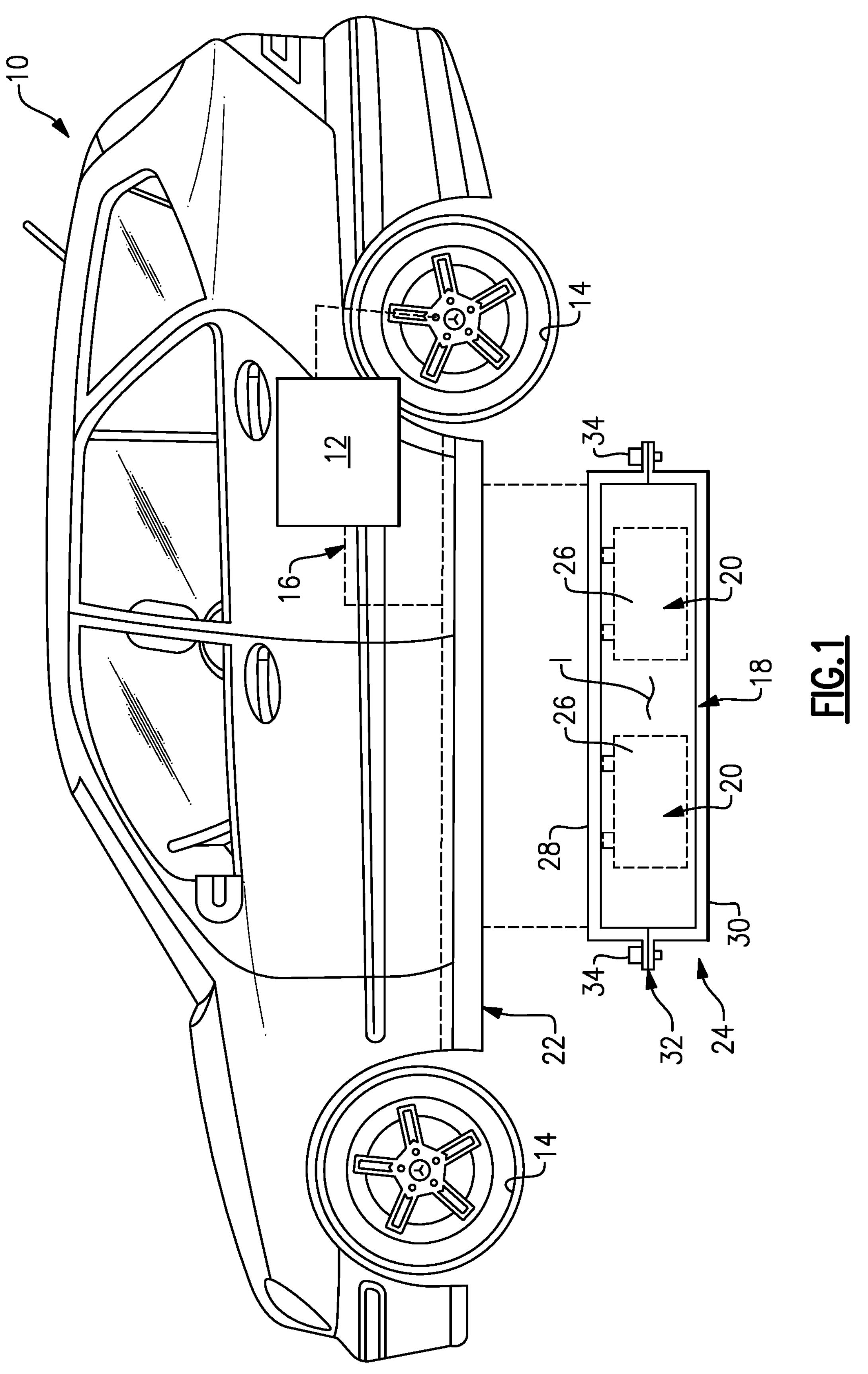
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the electrified vehicle 10 could be equipped with an internal combustion engine that can be employed either alone or in combination with other power sources to propel the electrified vehicle 10.

In the illustrated embodiment, the electrified vehicle 10 is a sport utility vehicle (SUV). However, the electrified vehicle 10 could alternatively be a car, a van, a pickup truck, or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more wheels 14 of the electrified vehicle 10.

A voltage bus 16 may electrically couple the electric machine 12 to a traction battery pack 18. The traction battery pack 18 is an exemplary electrified vehicle battery. The traction battery pack 18 may be a high voltage traction battery pack that includes one or more battery arrays 20 (i.e., battery assemblies or groupings of rechargeable battery cells 26) capable of outputting electrical power to power the electric machine 12 and/or other electrical loads of the electrified vehicle 10. Other types of energy storage devices and/or output devices could alternatively or additionally be used to electrically power the electrified vehicle 10.

The battery cells 26 may be stacked side-by-side along a stack axis to construct a grouping of battery cells 26, sometimes referred to as a "cell stack." In the highly schematic depiction of FIG. 1, the battery cells 26 are stacked in a direction into the page to construct each battery array 20, and thus the battery arrays 20 extend in cross-car direction. However, other configurations may also be possible.

The total number of battery arrays 20 and battery cells 26 provided within the traction battery pack 18 is not intended to limit this disclosure. In an embodiment, the battery cells 26 of each battery array 20 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The traction battery pack 18 may be secured to an underbody 22 of the electrified vehicle 10. However, the traction battery pack 18 could be located elsewhere on the electrified vehicle 10 within the scope of this disclosure.

An outer enclosure assembly 24 may house each battery array 20 of the traction battery pack 18. The outer enclosure assembly 24 may be a sealed enclosure and may embody any size, shape, and configuration within the scope of this disclosure. In an embodiment, the outer enclosure assembly 24 includes an enclosure cover 28 and an enclosure tray 30. Together, the enclosure cover 28 and the enclosure tray 30 may establish an interior I for housing the battery arrays 20 and other battery internal components (e.g., bussed electrical center, battery electric control module, wiring, connectors, etc.) of the traction battery pack 18.

During assembly of the traction battery pack 18, the enclosure cover 28 may be secured to the enclosure tray 30 at an interface 32 therebetween. The interface 32 may substantially circumscribe the interior I. In some implementations, mechanical fasteners 34 may be used to secure the enclosure cover 28 to the enclosure tray 30, although other fastening methodologies (adhesion, etc.) could also be suitable for this purpose.

Figure 2:
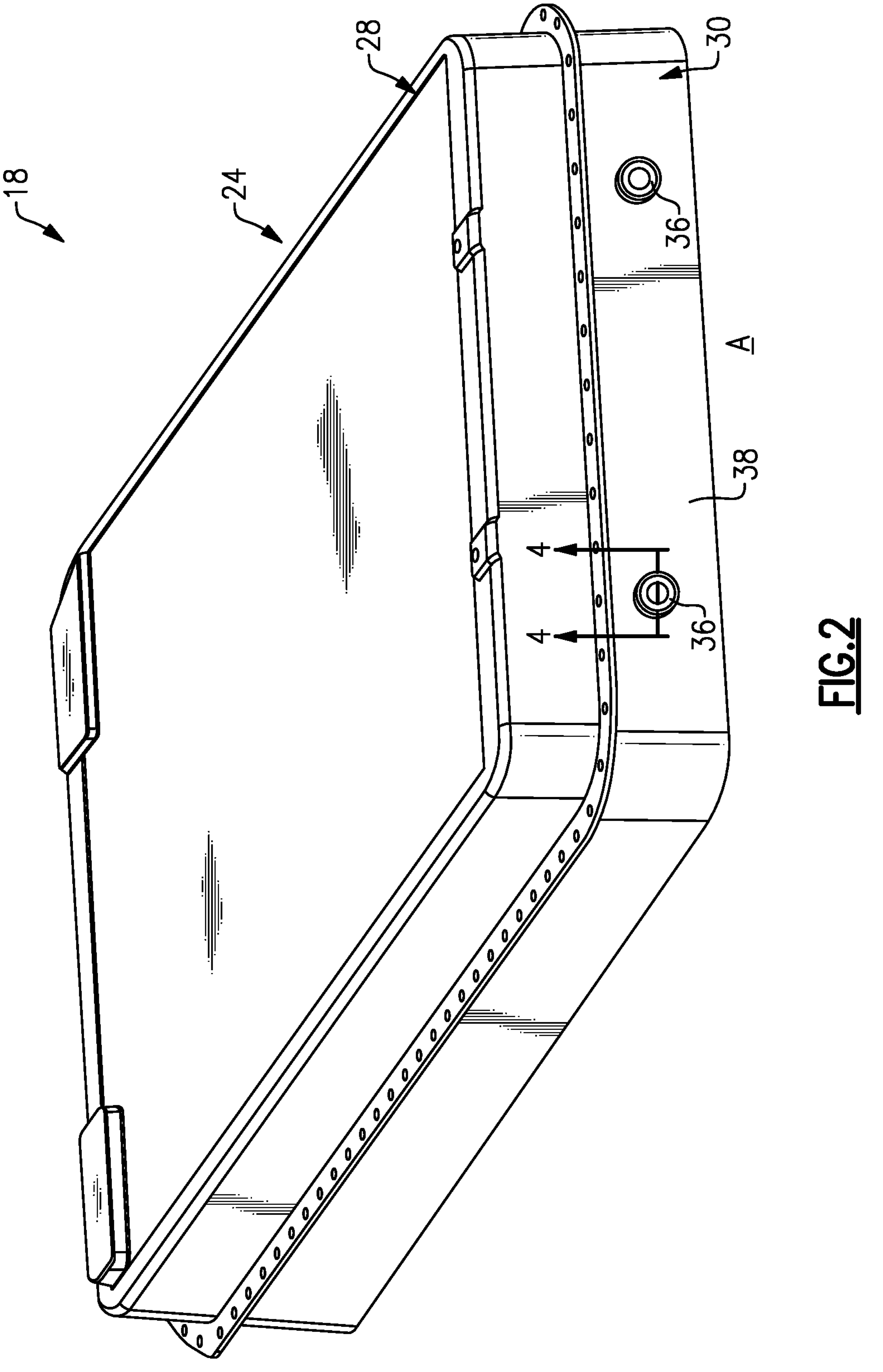
FIG. 2 is a perspective view of a traction battery pack for an electrified vehicle.

Referring now to FIG. 2, with continued reference to FIG. 1, the traction battery pack 18 may include one or more pressure equalization devices 36. Although two pressure equalization devices 36 are shown, the traction battery pack 18 may include a greater or fewer number of such devices.

Figure 3:
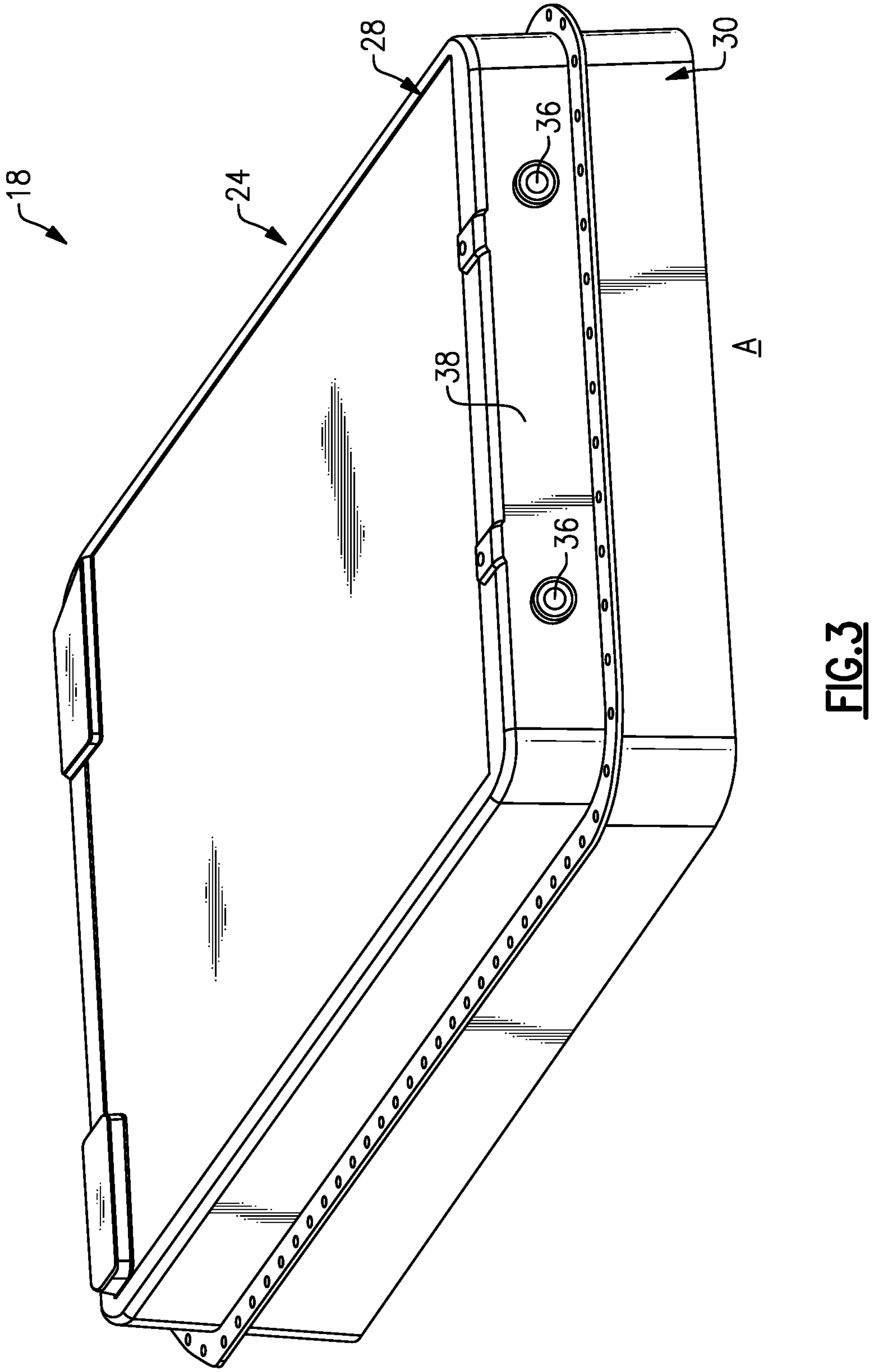
FIG. 3 is a perspective view of another exemplary traction battery pack.

Each pressure equalization device 36 may be disposed within a wall 38 of the outer enclosure assembly 24. In an embodiment, the wall 38 is part of the enclosure tray 30. In another embodiment, the wall 38 is part of the enclosure cover 28 (see FIG. 3). However, the exact mounting location of each pressure equalization device 36 could vary and is therefore not intended to limit this disclosure.

The pressure equalization devices 36 may be secured to the wall 38 in any manner. In an embodiment, each pressure equalization device 36 is secured within the wall 38 via a quarter turn mount. However, the pressure equalization devices 36 could alternatively or additionally be mounted via mechanical fasteners, cam locks, adhesion, etc.

Each pressure equalization device 36 may be configured to provide pressure equalization between the interior I of the traction battery pack 18 and an atmosphere A outside of the traction battery pack 18. For example, during normal battery operations, the pressure equalization devices 36 may allow gases (e.g., air) to flow in and out of the outer enclosure assembly 24 while preventing moisture, particle contaminants, etc. from entering the interior I of the traction battery pack 18.

There may be some operating conditions in which it is undesirable for gases to escape through the pressure equalization devices 36. For example, battery thermal events may occur during over-temperature, over-charging, or over-discharging conditions of the battery cells 26, or during other battery cell conditions. Battery vent byproducts may be released from one or more battery cells 26 of the battery arrays 20 during these conditions. If permitted to escape through the pressure equalization devices 36, the battery vent byproducts could permeate to undesirable areas of the vehicle. This disclosure is therefore directed to pressure equalization devices that are capable of both providing pressure equalization during normal battery operations and prohibiting battery vent byproducts from escaping the traction battery pack 18 through the pressure equalization devices during battery thermal events.

Figure 4:
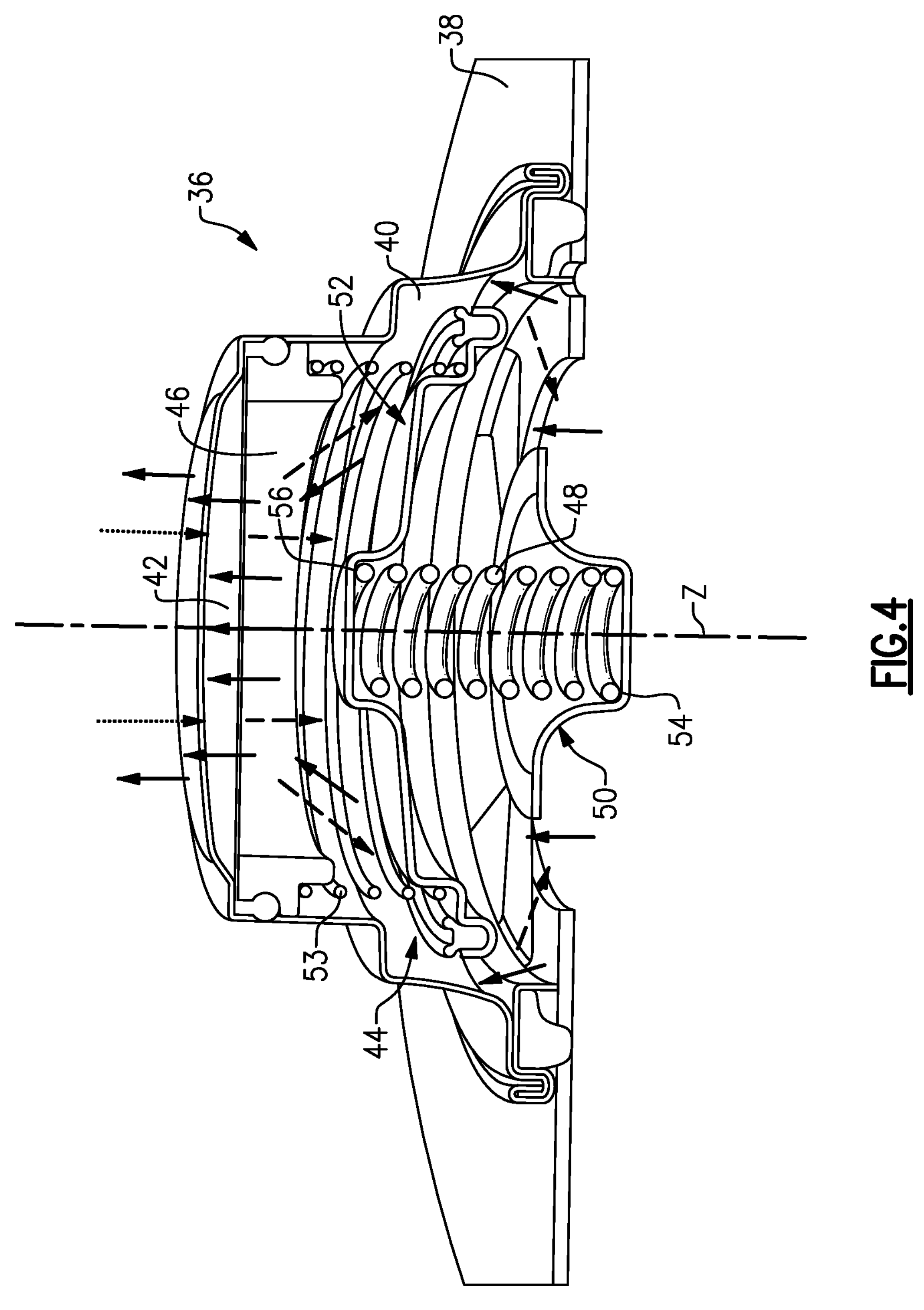
FIG. 4 is a cross-sectional view through section 4-4 of FIG. 2 and illustrates features associated with a pressure equalization device of the traction battery pack.

FIG. 4 illustrates an exemplary pressure equalization device 36 in cross-section. In this example, the pressure equalization device 36 includes a housing 40, a water-impermeable membrane 42, and an integrated valve 44. The housing 40 includes an internal bore 46, and each of the water-impermeable membrane 42 and the valve 44 may be accommodated within different sections of the internal bore 46.

The housing 40 may be a plastic component or a metallic component and may include a single-piece structure or a multi-piece structure. The size and shape of the housing 40 is not intended to limit this disclosure.

The housing 40 is oriented along a central axis Z. The valve 44 is also oriented along the central axis Z. In this embodiment, the valve 44 includes a spring 48, a spring holder 50, and a piston 52.

Figure 5:
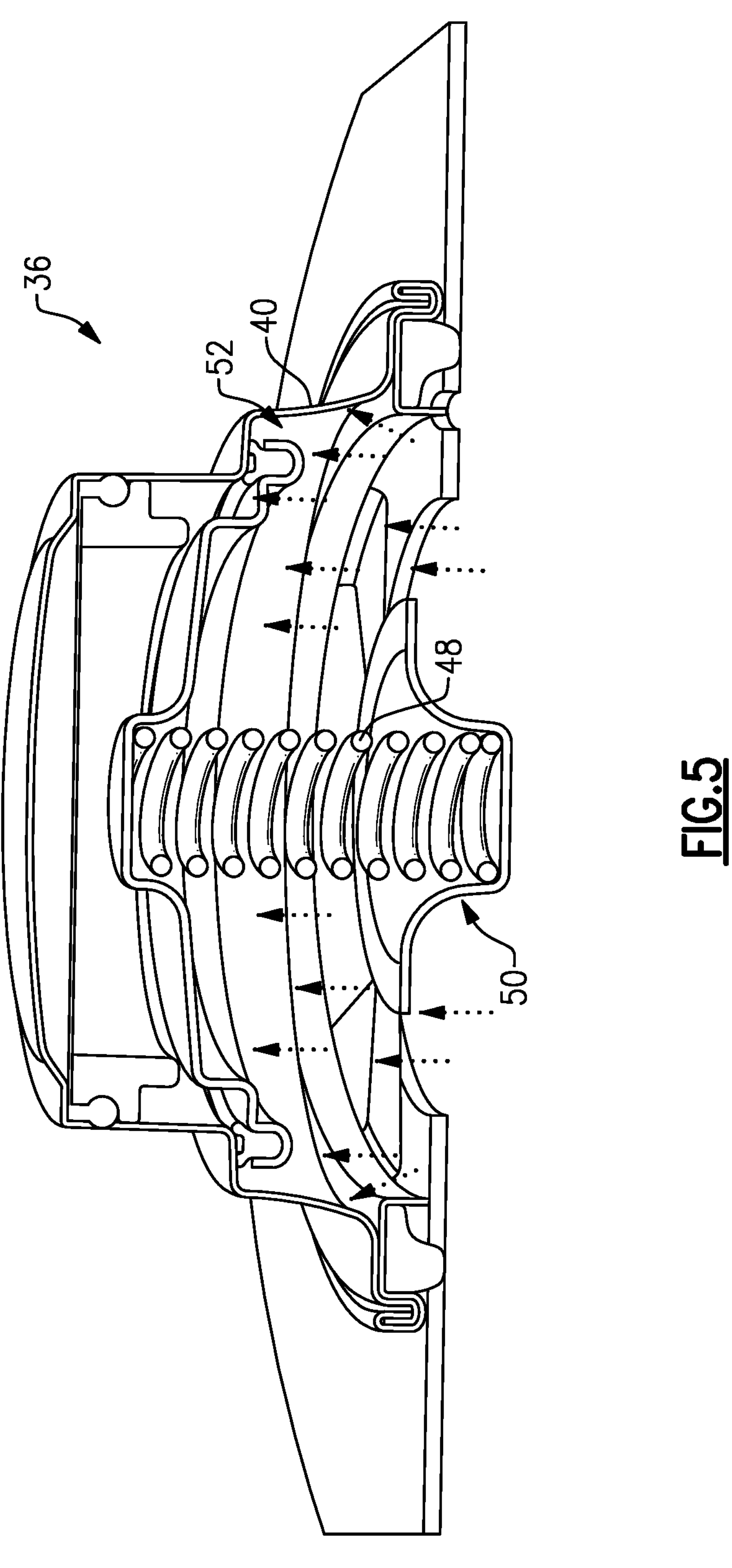
FIG. 5 is a view of the pressure equalization device similar to FIG. 4, with the valve in a closed position.

A first end 54 of the spring 48 is in contact with the spring holder 50, and a second end 56 of the spring 48 is in contact with the piston 52. The piston 52 is a solid structure without any openings and is configured to seal against a portion of the bore 46 of the housing 40, either directly or via intermediate structures such as seals or gaskets, to close the valve 44 and prevent the ingress or egress of fluid via the pressure equalization device 36. The piston 52 is centered, and biased to the open position of FIG. 4, by a spring 53. The valve 44 is shown in the closed position in FIG. 5. As shown in FIG. 5, the piston 52 contacts, either directly or indirectly, and seals against a portion of the bore 46 of the housing 40 to prevent the ingress or egress of fluid. In FIG. 5, the force of the spring 48 has overcome the force of the spring 53 such that the piston 52 has moved vertically upward, relative to FIGS. 4 and 5, to establish a seal.

While a spring 48 is shown in this embodiment, the spring 48 could be replaced with another type of actuating device, in other examples.

In this disclosure, the spring 48 is made of a shape-memory alloy material. Specifically, upon application of a relatively high temperature to the spring 48, the spring 48 is configured to rebound to a rebound shape to move the piston 52 in a direction opposite the spring holder 50 to close the valve 44. In one example, the spring 48 rebounds to the rebound shape during a battery thermal event.

The spring 48 may be made of any known SMA material, such as copper-aluminium-nickel and nickel-titanium (NiTi) alloys, as examples. This disclosure extends to other SMA materials, including but not limited to materials created by alloying zinc, copper, gold and iron. While shape-memory alloys are mentioned, the spring 48 could be made of other materials that expand sufficiently when exposed to heat to close the valve 44.

Figure 6:
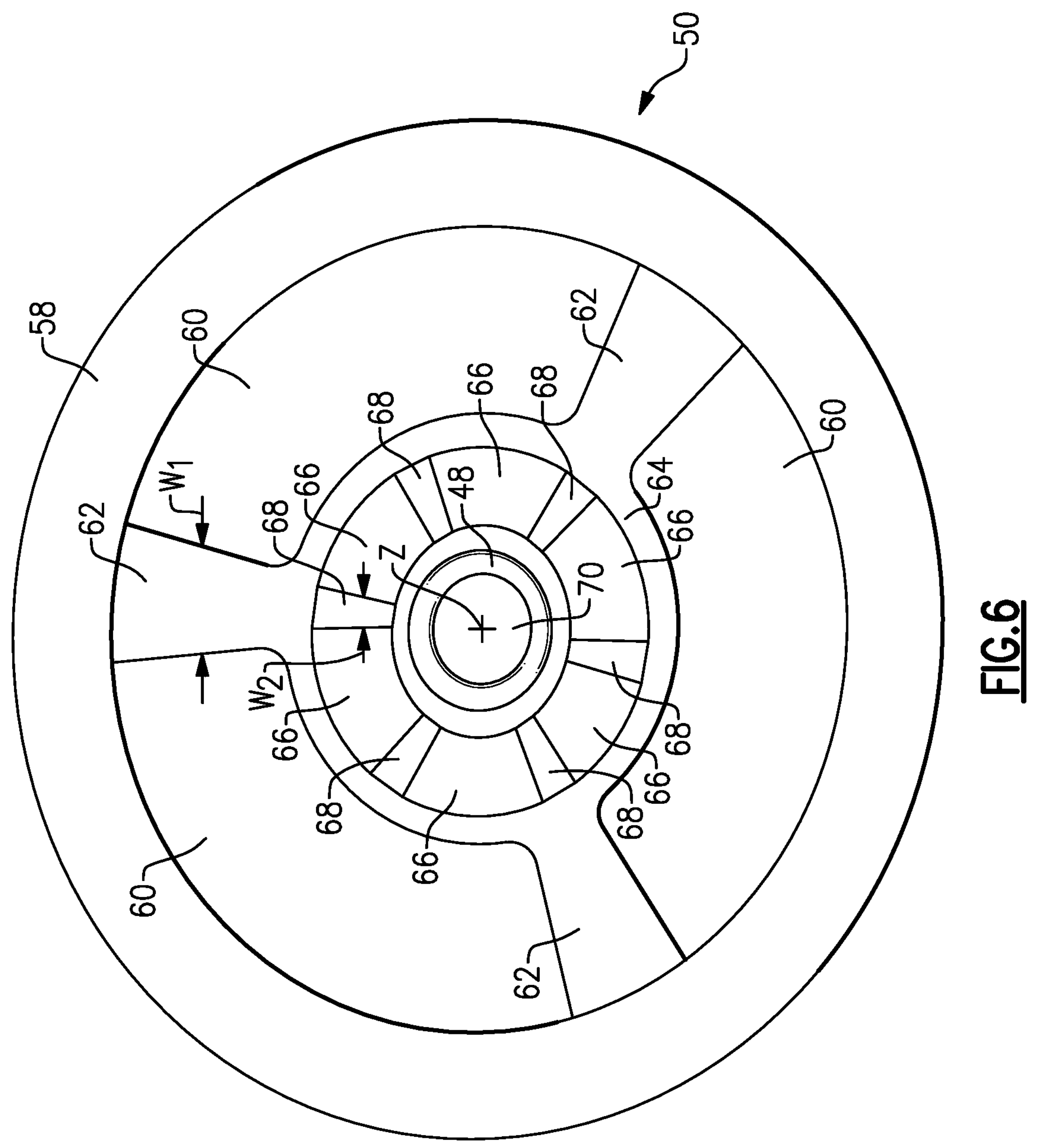
FIG. 6 is a top view of a first embodiment of a spring holder of the valve of the pressure equalization device.

FIG. 6 illustrates additional detail of an embodiment of the spring holder 50 according to one aspect of this disclosure. The spring 48 is shown in FIG. 6 for reference. FIG. 6 illustrates the spring holder 50 from a perspective of a point adjacent the piston 52 (i.e., from a perspective vertically above the spring holder 50, relative to FIGS. 4 and 5).

Moving radially outward to inward (the term "radial" is used with reference to the central axis Z), the spring holder 50 includes an outer ring 58. The outer ring 58 is continuous about the entire central axis Z. The outer ring 58 is fixedly mounted to the housing 40, in this example. Radially inward of the outer ring 58, the spring holder 50 includes a first set of openings 60 spaced-apart circumferentially from one another by first legs 62. The first legs 62 exhibit a width $W_1$ tapering moving radially inward, in this example. In this example, there are three first legs 62 and three openings 60 within the first set. This disclosure is not limited to a particular quantity of the first legs 62 or the openings 60.

The first legs 62 project from the outer ring 58 to an inner ring 64. The inner ring 64 is continuous about the entire central axis Z. In this example, the outer ring 58, the first legs 62, and the inner ring 64 all lie in a common plane, which is substantially perpendicular to the central axis Z.

Moving inward from the inner ring 64, the spring holder 50 includes a second set of openings 66 spaced-apart circumferentially from one another by second legs 68. The second legs 68 exhibit a width $W_2$ tapering moving radially inward, in this example. In this example, there are six second legs 68 and six openings 66 within the second set. This disclosure is not limited to a particular quantity of the second legs 68 or the openings 66.

The second set of openings 66 are spaced-apart from the spring 48, and the central axis Z, by a lesser distance, specifically a lesser radial distance, than the first set of openings 60. In this way, fluid flowing through the second set of openings 66 is more likely to flow closer to, and directly interact with, the spring 48. As such, during a battery thermal event, the spring 48 is configured to return to a rebound shape more rapidly than if the second set of openings 66 were not present.

The second set of legs 68 project from the inner ring 64 in both a radial direction, toward the central axis Z, and in an axial direction. In particular, the second set of legs 68 move axially away from the piston 52, generally into the page relative to FIG. 6, toward a wall 70. The wall 70 is configured to directly contact the first end 54 of the spring 48. When viewed from a point adjacent the piston 52, the second set of legs 68 are convex, as perhaps best seen in FIG. 4. The wall 70 lies in a plane substantially perpendicular to the central axis Z and substantially parallel to the common plane containing the outer ring 58, first set of legs 62, and the inner ring 64. The wall 70 provides a bottom of a recess for holding the spring 48. The wall 70 could have a central opening to permit additional fluid to flow relative to the spring 48.

Figure 7:
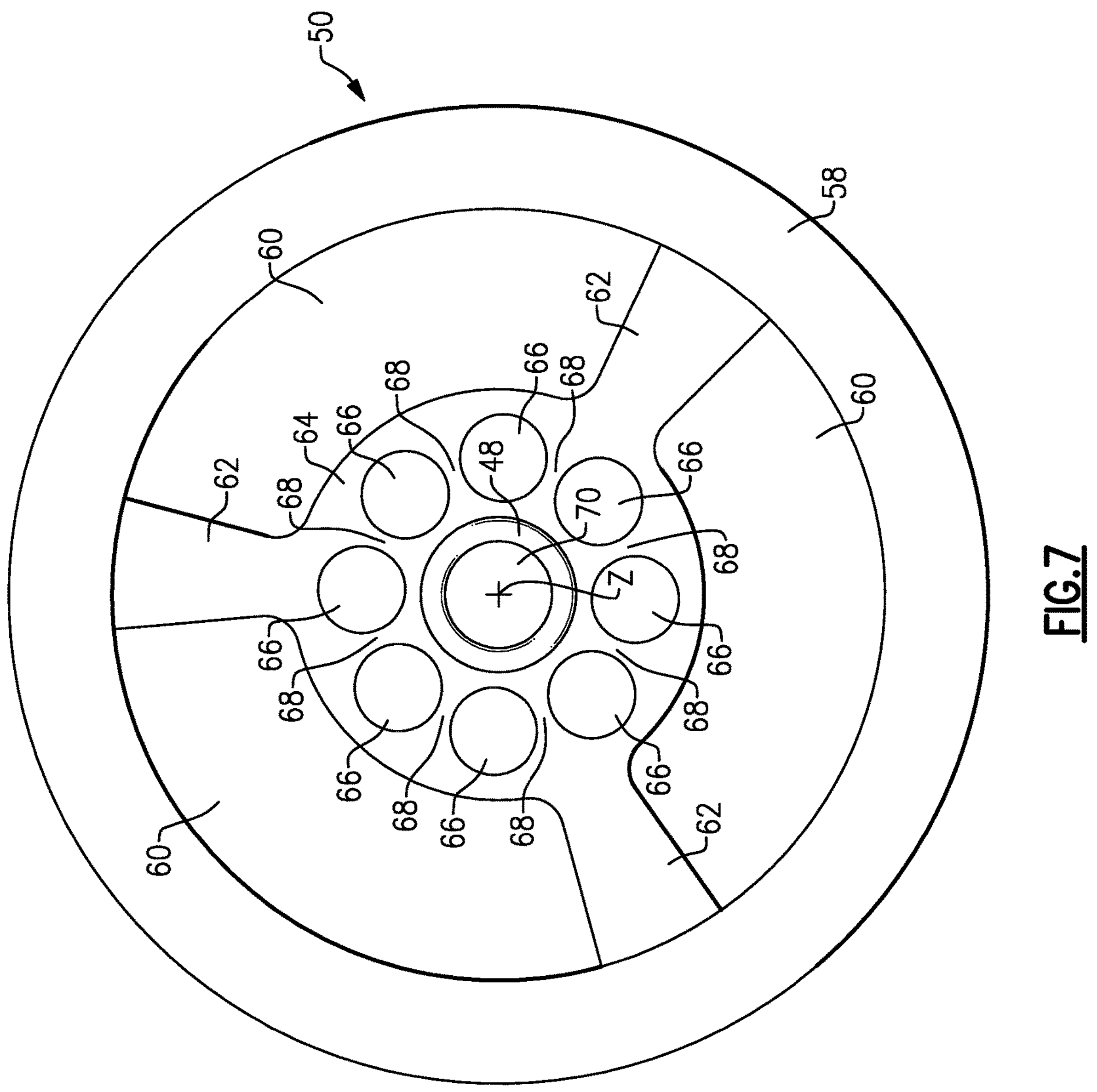
FIG. 7 is a top view of a second embodiment of the spring holder.

While the openings 66 of the second set exhibit a particular shape in FIG. 6 which substantially matches the shape of the openings 60 of the first set, this disclosure is not limited to a particular shape for the second set of openings 66. As shown in FIG. 7, the second set of openings 66 could be circular, when viewed from a point adjacent the piston 52, for example. The openings 66 could be shaped differently than what is shown in FIGS. 6 and 7, in other embodiments, such as triangularly-shaped. In FIG. 7, the second legs 68 exhibit a contour corresponding to the adjacent openings 66, and are generally hourglass shaped.

It should be understood that terms such as “about,” “substantially,” and “generally” are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A traction battery pack, comprising:

an outer enclosure assembly; and a pressure equalization device received within a wall of the outer enclosure assembly, wherein the pressure equalization device includes a housing and a valve configured to close a gas path through the housing during a battery thermal event of the traction battery pack, wherein the valve includes a spring configured to urge the valve to close during the battery thermal event, wherein the spring is held in place by a spring holder, wherein the spring holder includes a first set of openings spaced-apart from the spring by a first distance, and a second set of openings spaced-apart from the spring by a second distance less than the first distance.

2. The traction battery pack as recited in claim 1, wherein the spring holder includes a wall in contact with a first end of the spring.

3. The traction battery pack as recited in claim 2, wherein:

the spring holder includes a ring between the first set of openings and the second set of openings, and the ring is spaced-apart axially from the wall.

4. The traction battery pack as recited in claim 3, wherein the ring is continuous about an entire circumference of the ring.

5. The traction battery pack as recited in claim 3, wherein:

the spring holder includes a plurality of first legs spaced-apart circumferentially from one another by a respective one of the openings of the first set, and the spring holder includes a plurality of second legs spaced-apart circumferentially from one another by a respective one of the openings of the second set.

6. The traction battery pack as recited in claim 5, wherein:

the first legs project between the ring and an outer ring of the spring holder, and the second legs project between the ring and the wall.

7. The traction battery pack as recited in claim 5, wherein the first legs exhibit a width dimension tapering moving radially inwardly.

8. The traction battery pack as recited in claim 7, wherein the second legs exhibit a width dimension tapering moving radially inwardly.

9. The traction battery pack as recited in claim 5, wherein:

the first legs lie in a plane substantially perpendicular to a central axis of the valve, and the second legs project from the ring to the wall in both an axial direction and a radial direction.

10. The traction battery pack as recited in claim 9, wherein the second legs are curved such that the second legs are convex when viewed from a point adjacent a piston in contact with the spring.

11. The traction battery pack as recited in claim 1, wherein the first set of openings and the second set of openings are differently-shaped.

12. The traction battery pack as recited in claim 11, wherein the second set of openings are circular-shaped when viewed from a point adjacent a piston in contact with the spring.

13. The traction battery pack as recited in claim 2, wherein:

a second end of the spring is in contact with a piston, the second end is opposite the first end, and during the battery thermal event, the spring is configured to move the piston in a direction opposite the spring holder to close the valve.

14. The traction battery pack as recited in claim 1, comprising a plurality of battery arrays housed inside the outer enclosure assembly.

15. The traction battery pack as recited in claim 1, wherein the spring is made of a shape-memory alloy.

16. A pressure equalization device for traction battery pack, comprising:

a housing; and a valve configured to close a gas path through the housing during a battery thermal event of the traction battery pack, wherein the valve includes a spring configured to urge the valve to close during the battery thermal event, wherein the spring is held in place by a spring holder, wherein the spring holder includes a first set of openings spaced-apart from the spring by a first distance, and a second set of openings spaced-apart from the spring by a second distance less than the first distance.

17. The pressure equalization device as recited in claim 16, wherein:

the spring holder includes a wall in contact with a first end of the spring, the spring holder includes a ring between the first set of openings and the second set of openings, and the ring is spaced-apart axially from the wall.

18. The pressure equalization device as recited in claim 17, wherein:

the spring holder includes a plurality of first legs spaced-apart circumferentially from one another by a respective one of the openings of the first set, and the spring holder includes a plurality of second legs spaced-apart circumferentially from one another by a respective one of the openings of the second set.

19. The pressure equalization device as recited in claim 18, wherein:

the first legs project between the ring and an outer ring of the spring holder, and the second legs project between the ring and the wall.

20. The pressure equalization device as recited in claim 18, wherein:

the first legs lie in a plane perpendicular to a central axis of the valve, the second legs project from the ring to the wall in both an axial direction and a radial direction, and the second legs are curved such that the second legs are convex when viewed from a point adjacent a piston in contact with the spring.

* * * * *